United States Patent Office 3,336,224
Patented Aug. 15, 1967

3,336,224
HIGH ALKALINITY OVERBASED PHENATE
Nylen L. Allphin, Jr., Pinole, Calif., assignor to Chevron Research Company, a corporation of Delaware
No Drawing. Filed Apr. 28, 1965, Ser. No. 451,659
4 Claims. (Cl. 252—33.4)

This invention concerns novel overbased calcium phenates. More particularly, this invention concerns novel overbased calcium phenates having greatly enhanced amounts of calcium and their method of preparation.

Basic sulfurized calcium alkylphenates are used as compounding agents in lubricating oils to neutralize harmful acids, and to inhibit corrosion, piston ring sticking and gum formation in internal combustion engines resulting from oxidation of the lubricating oil and oxidation polymerization of the engine fuel residues.

For many years, metal salts of phenolic materials have been used as additives for mineral lubricating oil compositions used in the lubrication of internal combustion engines. In combination with numerous other additives, the metal phenates improve the detergency characteristics of the lubricating oil, reduce engine wear, minimize the formation of harmful deposits on engine parts, and improve the resistance of the oil to oxidation.

Numerous attempts have been made to prepare oil-soluble sulfurized calcium alkylphenates which have the detergent characteristics of the metal phenates, and, in addition thereto, the property of neutralizing larger amounts of acidic bodies than possible with the presently available "normal" or "basic" sulfurized calcium phenates. In U.S. Patent No. 3,036,971, a process was disclosed which combined an alkylphenol, calcium oxide or hydroxide, sulfur and glycol in a mineral oil diluent, removed the glycol and then heated the mixture at elevated temperatures while passing carbon dioxide gas into the mixture. This method provided a mixture having 4.4 weight percent calcium as a stable mixture.

In U.S. Patent No. 3,178,368, the disclosure of which is incorporated herein by reference, the amount of calcium was further improved by sulfurizing an alkylphenol in the presence of calcium sulfonate, a monohydric and dihydric alcohol and a basic calcium source and then carbonating at elevated temperatures followed by removal of volatile materials. By this process, a composition having at least 9 weight percent of calcium was obtained.

Pursuant to this invention, overbased phenate compositions are obtained which have at least 10.0 weight percent calcium, a good color and are stable—the calcium compounds remain dispersed in the mixture without the formation of insoluble sludges—by increasing the amount of calcium by at least 0.5 weight percent calcium, and generally at least about 1.0 weight percent calcium, by adding calcium or calcium hydride at elevated temperatures to an overbased phenate having at least 9 weight percent calcium. Thus the increased available calcium provides greater alkalinity for the same weight of material than previously obtained, providing increased protection against the formation of corrosive acids in the engine.

As indicated, the novel overbased phenates having at least 10.0 weight percent of calcium are obtained by combining at elevated temperatures a calcium phenate having at least about 9 weight percent calcium, and less than 10 weight percent calcium with calcium metal or calcium hydride at elevated temperatures and then filtering the resulting product to remove any filterable solids present. Basically, the process requires carbonating at elevated temperatures a sulfurized calcium alkylphenate in the presence of calcium sulfonate, and a mono- and dihydric alcohol and then further enhancing the calcium content or alkalinity by treating the resulting mixture with calcium hydride or calcium at elevated temperatures.

The calcium or calcium hydride which is used is desirably finely dispersed, for example, as a very fine powder. The finer the dispersion of the calcium or calcium hydride the more effective will be its reaction in enhancing the calcium content, since coating of the metal or metal hydride will be avoided.

The calcium or calcium hydride will be used in an amount of from 1 to 12 times, desirably 2 to 10 times, the weight required to obtain the desired increase in calcium content.

The temperature at which the calcium or calcium hydride is added will generally be in the range from about 100° to 150° C. The time for the reaction will depend on the temperature, the amount of calcium or calcium hydride, the size of the calcium or calcium hydride particles, etc. Usually, the reaction will require at least about one-half hour and will generally not exceed 12 hours. More usually, the time will vary from about 1 to 6 hours. In order to further enhance the rate of reaction, the mixture should be efficiently agitated, stirring usually sufficing.

After it appears that no further action is occurring, the heating is stopped and the reaction mixture filtered to remove any solid particulate matter. The resultant product is found to have an increase of at least about 0.5 weight percent calcium, and usually an increase of at least about 1 weight percent calcium can be achieved. By starting with a calcium phenate having at least about 9 weight percent calcium, a final product is obtained having from about 10 to 11.5 weight percent calcium, more usually from 10.0 to 11.0 weight percent calcium. Moreover, the viscosity of the product is approximately the same as the original overbased phenate (having approximately 9 weight percent calcium). The viscosity will be in the range from about 150 to 5000, more usually 500 to 2000 SSU at 210° F.

The process for preparing overbased phenates having about 9 weight percent calcium is extensively described in U.S. Patent No. 3,178,368. Therefore, rather than repeating all of the disclosure of that application, only those portions which are important to the preparation of the starting material will be discussed.

The process for preparing the original calcium phenate comprises blending and heating with agitation a mixture of an alkylphenol, calcium sulfonate, a monohydric alcohol of at least 8 carbon atoms, and sulfur in a lubricating oil medium, adding hydrated lime or calcium oxide to the mixture and then heating with the addition of ethylene glycol. The water which is formed is removed, the mixture cooled and carbon dioxide introduced. The mixture is then heated to a temperature and at a pressure to permit the removal of ethylene glycol, water and the monohydric alcohol.

Alkylphenols which are used herein in the reaction mixture are represented by the formula

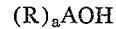

(R)$_a$AOH wherein A is a "hydrocarbon" aromatic radical, i.e., a benzene radical, R is a straight-chain or branched-chain, saturated or unsaturated aliphatic hydrocarbon radical having from 4 to 30 carbon atoms and $a$ is a number having a value from 1 to 2. The total number of carbon atoms for $a$R has a minimum value of 8 and a maximum of 40. Thus, when $a$ is 1, the minimum number of carbon atoms in R is 8.

Examples of suitable hydrocarbon radicals include alkyl radicals, such as butyl, hexyl, octyl, decyl, dodecyl, hexadecyl, eicosyl, tricontyl radicals; radicals derived from petroleum hydrocarbons, such as white oil, wax, olefin polymers (e.g., polypropylene and polybutylene), etc.

The basic sulfonates used herein contain from 0 to

300% of metal in excess of the metal of normal sulfonates, that is, essentially neutral, metal sulfonates. The basic sulfonates used herein are derived from neutral sulfonates represented by the formula $$[(R^1)_aASO_3]_2M$$

wherein $R^1$ is a high molecular weight straight-chain or branched-chain saturated or unsaturated essentially hydrocarbon radical, usually aliphatic, having a molecular weight of about 150 to about 800; A is an aromatic hydrocarbon radical, such as benzene, naphthalene, anthracene, etc.; $a$ is a number having the value of 1 to 4; and M is calcium.

Examples of suitable hydrocarbon radicals are the following: dodecane, hexadecane, eicosane, triacontane radicals; radicals derived from petroleum hydrocarbons, such as white oil, wax, olefin polymers (e.g., polypropylene and polybutylene, etc.). The sulfonic acids used in preparing the basic sulfonates of this invention also include the oil-soluble sulfonic acids obtained from petroleum, such as the "mahogany" acids, and the synthetic sulfonic acids prepared by various methods of synthesis (e.g., sulfonic acids prepared by reacting a chlorinated white oil with benzene, using hydrofluoric acid as the catalyst, then treating the resulting white oil alkylated benzene with chlorosulfonic acid of fuming sulfuric acid to form a white oil benzene sulfonic acid).

The metal sulfonates are exemplified as follows: calcium white oil benzene sulfonate, calcium dipolypropylene benzene sulfonate, calcium mahogany petroleum sulfonate, calcium triacontyl benzene sulfonate, etc.

The high molecular weight alcohol, which is used in amounts no more than 75% by weight of the alkylphenol charged, preferably 10 to 50%, are those monohydric alcohols containing from 8 to 18 carbon atoms. These alcohols are exemplified as follows: octyl alcohol, decyl alcohol, dodecyl alcohol, tridecyl alcohol, tetradecyl alcohol, cetyl alcohol, etc.

In the process described herein, a lubricating oil may be used as a reaction medium. Thus, by such use of a lubricating oil, oil concentrates of the desired highly basic carbonated sulfurized calcium phenates can be obtained. Such lubricating oils include a wide variety of lubricating oils, such as naphthenic base, paraffin base and mixed base lubricating oils, other hydrocarbon lubricants, e.g., lubricating oils derived from coal products, and the synthetic oils, e.g., alkylene polymers (such as polymers of ethylene, propylene, butylene, etc., and mixtures thereof); alkylene oxide type polymers, etc.

The several components which are used in this process are used in certain proportions with respect to each other. For each molar quantity of alkylphenol, it is desirable to use from 0.01 to 1 mole of sulfonate, preferably 0.01 to 0.05 mole, and from 0.1 to 1.5 moles of high molecular weight alcohol, preferably tridecyl alcohol.

The amount of elemental sulfur present in the reaction mixture is such that the mole ratio of sulfur to calcium is from 0.25 to 4.0, preferably in the range of 0.5 to 1.5.

The amount of calcium oxides or hydroxide used in the reaction depends on the amount of metal desired in the product in excess of that of the normal phenate. Normally, in the preparation of basic carbonated sulfurized phenates, prior to the further addition of calcium hydride or calcium, a slight excess (e.g., 5 mole percent excess) of calcium oxide or hydroxide is used in the reaction mixture over that desired in the final basic phenate product. Since, usually, at least about 80% of the inorganic calcium added is incorporated in the product, between 9–11 weight percent of calcium (based on the final composition) is added as calcium oxide or hydroxide.

The carbon dioxide used is from 300 mole percent to 10 mole percent, preferably 150 mole percent to 10 mole percent of the alkylphenol charged.

It is preferred to use ethylene glycol as the polyhydric alcohol. The amount of glycol will depend upon the amount of calcium oxide or hydroxide used.

A sufficient amount of glycol is employed to bring the reactants into efficient contact for substantial reaction in a reasonably short time; that is, the amount of glycol used is sufficient to dissolve a portion of each of the reactants and to cause substantial contact between said reactants. For this purpose it is beneficial to use certain ratios by weight of the calcium oxide or hydroxide to glycol. The calcium:glycol mole ratio may vary from 2 to 1 to about 0.25 to 1.0; preferably, from 1 to 1 to about 0.5 to 1.

According to the process described herein, there is first formed a blend consisting of an alkylphenol, a sulfonate, a high molecular weight alcohol, and an inert oil of lubricating viscosity. This mixture is then heated with agitation to temperatures from 150° to 190° F., followed by the addition of the sulfur and calcium hydroxide (or oxide). This blend is then heated to temperatures in the range of 250° to 300° F., and that temperature is maintained while ethylene glycol is slowly added. The water of reaction liberated after the addition of the glycol is then removed by heating to temperatures of about 340° F. The reaction mixture is cooled slightly, followed by carbonation by means of carbon dioxide at temperatures from 250° to 350° F. Any uncombined $CO_2$ is then removed. The reaction blend is then heated for 2 to 10 hours at temperatures ranging from 300° to 390° F., during which heating the absolute pressure is reduced to 40–50 mm. Hg to remove glycol. In certain instances, some of the high molecular weight alcohols may be removed along with the ethylene glycol. However, whether or not any or all of the high molecular weight alcohol is removed, the resulting lubricating oil composition is highly effective for its intended purpose. With monohydric alcohols of from 9 to 15 carbon atoms, generally from 10 to 50 weight percent of the alcohol originally charged will be retained in the final composition. However, the high molecular weight alcohol may be removed in its entirety or amounts up to 100% of the initial charge may remain in the final composition.

The following examples are offered by way of illustration and not by way of limitation.

EXAMPLE A

*Preparation of basic sulfurized carbonated calcium alkylphenate*

A mixture of 4,170 lbs. of an alkylphenol having a hydroxyl number of 184 wherein the alkyl radical was derived from a polypropylene having an average of 12 carbon atoms, 508 gals. of a California refined base oil having a viscosity of 130 SSU at 100° F., 436 lbs. of a basic calcium sulfonate containing 40% calcium in excess of that amount for a neutral sulfonate * (i.e., the base ratio was 1.4:1), and 1,294 lbs. of tridecyl alcohol was heated to 180° F. with agitation. Sulfur, 854 lbs. was charged to the vessel with the temperature maintained at 180–190° F. Hydrated lime, 1,974 lbs., was added to the blend. The temperature of the reaction mixture was increased to 260° F. Unheated ethylene glycol, 134 gals., was added slowly to the reaction mixture, which was kept at a temperature of 260–270° F. for the glycol addition. The reaction mixture was then heated to 340° F. to remove water.

With rapid agitation of the reaction mixture, 574 lbs. of $CO_2$ was added at a rate of 100 lbs./hr. at an initial temperature of 330° F. Uncombined $CO_2$ was removed. The mixture was heated to 390° F. at an absolute pressure of approximately 40 mm. Hg to remove, by distillation, water, ethylene glycol and tridecyl alcohol. The re-

---

*The metal sulfonate used in the example hereinabove was a concentrate consisting of 44.4% by weight of a mineral lubricating oil and 55.6% by weight of a calcium petroleum sulfonate wherein the petroleum radical was derived from a mineral oil having a viscosity of 500 SSU at 100° F. The calcium content of the oil concentrate was 2.3% by weight, and the base ratio was 0.4. (Base ratio=basic calcium/neutral calcium.)

maining lubricating oil blend contained 9.2%, by weight, calcium. Alkalinity value=255 (base equal to an equivalent number of mg.KOH/gm. of sample); viscosity=572 SSU at 210° F.

EXAMPLE 1

Into a reaction flask was introduced 50 g. of the overbased phenate prepared in Example A, and 5 g. of calcium hydride powder, and the mixture heated at 130° C. for 3 hours. The mixture was cooled and filtered through Celite. The resulting product had an alkalinity value of 285, an increase of 30 units over the original product. Weight percent Ca=10.4; viscosity=625 SSU at 210° F.

As noted hereinabove, it is desirable that the final lubricating oil composition has a high basicity. In the process described, it is desirable that the initial amount of alkylphenol be from 20 to 45%, by weight, based on the final composition, preferably from 25–35%, by weight. The lubricating oil reaction medium is used in amounts from 15 to 50%, by weight, based on the finished composition, preferably from 20 to 30% by weight.

As indicated, the product of this invention has a calcium weight percent of at least 10 and as high as 11.5, usually 10.0 to 11.0, and a viscosity in the range of 150 to 5000 SSU at 210° F. The enhanced calcium content provides for improved corrosion inhibition, particularly greater capability for neutralizing corrosive acids formed in the engine and improving engine performance.

As will be evident to those skilled in the art, various modifications on this invention can be made or followed, in the light of the foregoing disclosure and discussion, without departing from the spirit or scope of the disclosure or from the scope of the following claims.

I claim:

1. In a process for preparing sulfurized calcium carbonated alkylphenate comprising forming a blend comprising a hydrocarbon lubricating oil, an alkylphenol wherein said alkyl radical has from 4 to 30 carbon atoms and the total number of carbon atoms in the alkyl groups is at least 8, a calcium alkyl aryl sulfonate in an amount of from 0.01 to 1 mole per mole of said alkylphenol and and aliphatic saturated monohydric alcohol having from 8 to 18 carbon atoms in an amount of from 10 to 75% by weight of said alkylphenol, heating said blend to a temperature in the range of 150° to 190° F., adding thereto a basic substance which is a member of the group consisting of calcium hydroxide and calcium oxide in an amount necessary to provide at least about 9 weight percent of calcium in the final composition, and sulfur in an amount such that the mole ratio of sulfur to basic substance has a value from 0.25 to 4, heating said blend to temperatures in the range of 250° to 300° F., and at that temperature adding ethylene glycol thereto in an amount such that the mole ratio of basic substance to ethylene glycol is from about 2:1 to about 0.25:1, removing the resulting water of reaction by heating to temperatures of about 345° F., adding carbon dioxide in an amount of 10 mole percent to 300 mole percent of said alkylphenol while maintaining a temperature of at least 250° F., heating the mixture at temperatures in the range of 300°–390° F. at reduced pressure to remove ethylene glycol, the improvement which comprises increasing the calcium content by at least 0.5 weight percent of the above composition by adding to the prepared composition as described above at elevated temperatures from 1 to 12 times the weight percent of calcium increase desired of a member of the group consisting of calcium and calcium hydride.

2. A process according to claim 1, wherein calcium or calcium hydride is added in from 2 to 10 times the weight percent of calcium increase desired.

3. A composition prepared according to claim 1.

4. A composition prepared according to claim 1, having from about 10 to 11.5 weight percent calcium and a viscosity in the range of 150 to 5,000 SSU at 210° F.

References Cited

UNITED STATES PATENTS 3,178,368  4/1965  Hanneman _____ 252—42.7 X

DANIEL E. WYMAN, *Primary Examiner.*

P. P. GARVIN, *Assistant Examiner.*